US007519242B2

(12) United States Patent
Tapanes

(10) Patent No.: US 7,519,242 B2
(45) Date of Patent: Apr. 14, 2009

(54) PERIMETER SECURITY SYSTEM AND PERIMETER MONITORING METHOD

(75) Inventor: Edward Edwardo Tapanes, Glen Waverley (AU)

(73) Assignee: Future Fibre Technologies Pty Ltd, Rowville, Victoria (AU)

( * ) Notice: Subject to any disclaimer, the term of this patent is extended or adjusted under 35 U.S.C. 154(b) by 721 days.

(21) Appl. No.: 10/500,642

(22) PCT Filed: Jan. 4, 2002

(86) PCT No.: PCT/AU02/00007

§ 371 (c)(1), (2), (4) Date: Jul. 1, 2004

(87) PCT Pub. No.: WO02/071356

PCT Pub. Date: Sep. 12, 2002

(65) Prior Publication Data

US 2005/0147340 A1 Jul. 7, 2005

(51) Int. Cl.
*G02B 6/00* (2006.01)
*G01N 21/00* (2006.01)
*G01B 9/02* (2006.01)

(52) U.S. Cl. .......................... 385/12; 385/13; 356/73.1; 356/477; 356/483

(58) Field of Classification Search .................. 385/12, 385/13, 147; 356/73.1, 477, 483; 340/541, 340/552, 555–557
See application file for complete search history.

(56) References Cited

U.S. PATENT DOCUMENTS 4,297,684 A 10/1981 Butter
4,931,771 A 6/1990 Kahn
4,990,769 A 2/1991 Hazan et al.

(Continued)

FOREIGN PATENT DOCUMENTS

DE 44 27 514 A1 2/1996

(Continued)

*Primary Examiner*—Kevin S Wood
*Assistant Examiner*—John M Bedtelyon
(74) *Attorney, Agent, or Firm*—Workman Nydegger

(57) ABSTRACT

A perimeter security system is disclosed which includes a first cable (40) and a second cable (60) buried beneath the ground in a zig-zag pattern. The first cable (40) has a first fibre (44) and a further fibre (42). Second cable (60) has a second fibre (62). The first and second fibres (44) and (62) are connected by a coupler (52) at one end so that light can be launched into the first and second fibres (44) and (62) to propagate in one direction. The further fibre (42) is connected to a coupler (70) which also connects to the other end of the first and second fibres (44) and (62) so light can be launched into the fibres from the other end and travel in the opposite direction. Detectors (80) and (82) are provided for detecting an interference pattern produced by interference of the propagating light signals so that if a person attempts to breach the barrier by walking across the ground beneath which the cables are buried, the cables are moved to change the nature of the propagating light to in turn change the interference pattern to provide an indication of the intrusion. The location of the intrusion can also be determined by the time difference between receipt of the altered interference pattern propagating in the first direction, compared to that propagating in the opposition direction.

11 Claims, 2 Drawing Sheets

U.S. PATENT DOCUMENTS

| | | | | | |
|---|---|---|---|---|---|
| 5,012,679 | A | * | 5/1991 | Haefner | 73/800 |
| 5,134,386 | A | | 7/1992 | Swanic | |
| 5,194,847 | A | | 3/1993 | Taylor et al. | |
| 5,455,698 | A | | 10/1995 | Udd | |

FOREIGN PATENT DOCUMENTS

| | | | |
|---|---|---|---|
| GB | 2 258 553 | A | 2/1993 |
| JP | 2000/048269 | | 2/2000 |
| JP | 2000-48269 | | 2/2000 |
| WO | WO 98/26388 | | 6/1998 |
| WO | WO 00/37925 | | 6/2000 |
| WO | WO 00/67400 | | 11/2000 |
| WO | WO 00/67400 | A1 | 11/2000 |
| WO | WO 01/39148 | A1 | 5/2001 |

* cited by examiner

PERIMETER SECURITY SYSTEM AND PERIMETER MONITORING METHOD

FIELD OF THE INVENTION

This invention relates to a perimeter security system and to a method of monitoring a perimeter.

Optical devices are commonly used in industry and science in order to transmit data from one place to another. Photronics technology has revolutionised the communications and sensor fields due to the rapid development of optical and opto-electronic devices.

ART BACKGROUND

Our International application PCT/AU99/01028 discloses a system in which the location of a disturbance to a fibre and, in particular to a communication fibre can be determined. This system utilising counter-propagating optical signals so that light signals propagate in both directions along a waveguide. Any attempt to disturb the waveguide will cause a change in the counter-propagating signals and that change can be detected by detectors so that a time difference between receipt of the modified counter-propagating optical signals enables the location of the disturbance to be determined.

Our International application number PCT/AU00/00382 discloses a system in which both a sensing signal and a communication signal can be launched into a single waveguide and transmitted along the waveguide with minimal losses to both the sensing signal and the communication signal.

Our International application number PCT/AU00/01332 discloses a method and system in which perimeter barrier elements such as fence sections are spring mounted for limited movement. An optical fibre is connected to the elements so that any attempt to break in or tamper with the fence causes the element to move against the bias of the spring which in turn moves the optic fibre so that a change in a parameter of the light travelling through the fibre can be detected in order to provide an indication of the intrusion or tampering.

The contents of the above four International applications are incorporated into this application by this reference.

The perimeter barrier technique disclosed in the above-mentioned International application provides an extremely efficient monitoring system and method for perimeter barriers which include fences or other physical elements which are intended to provide a barrier against ingress of individuals. Since the above invention operates by spring mounted fence elements having a fibre in proximity to the fence element so that movement of the element moves the fibre, it is necessary that, in the earlier invention, the perimeter barrier be formed by a physical structure to which the fibre is attached. The present invention relates to a perimeter barrier system in which there is no physical barrier required in order to operate the detecting system and which is therefore suitable for location in the ground to provide security to a perimeter of a required area.

SUMMARY OF THE INVENTION

The invention, in a first aspect, may be said to reside in a perimeter security system including;

at least a first waveguide buried below ground level and extending along a perimeter which defines an area to be monitored;

means for launching light into the first waveguide; and a detector for detecting light which has propagated through the waveguide so as to detect a change in a parameter of the light propagating through the waveguide due to an intrusion across the ground beneath which the waveguide is buried and for providing an indication of that intrusion.

Preferably at least a second waveguide is also provided, and the means for launching the light, launches the light into both the first and second waveguides;

coupling means for coupling the first and second waveguides together so that light propagating through the first and second waveguides is caused to interfere to create an interference pattern; and wherein the detector detects the interference pattern and upon an intrusion a parameter of light passing through one of the waveguides is altered with respect to the same parameter of the light passing through the other of the waveguides, to thereby change the interference pattern detected by the detector to provide an indication of the intrusion.

Preferably the first and second waveguides are provided in at least one cable.

Most preferably the first and second waveguides are provided in separate cables and the separate cables are buried beneath ground level in zig-zag spaced apart relationship with respect to one another to define a perimeter region having a substantial width which will be traversed by a person intruding into the area.

Preferably the substantial width is a width such that a person travelling in normal walking or running motion will not step over the width of the region.

Most preferably the width of the region is between one and two meters.

In the most preferred embodiment of the invention counter-propagating light signals are launched into each of the waveguides so that the location of an intrusion can be detected by the time difference between detection of the changed interference pattern propagating in one direction and to the changed interference pattern propagating in the opposite direction.

Preferably a first of the said cables contains said at least one waveguide and a second said cable contains said second waveguide;

a further waveguide being contained within the first cable;

first coupling means at one end of the said first, second and further waveguides for coupling the waveguides so that light launched into the said other waveguide is able to propagate through the other waveguide and then into the said first and said second waveguides to propagate in a first direction through the said first and second waveguides;

second coupling means at the other end of said first and said second waveguides so that the light propagating in the said first direction through said first and second waveguides is able to coherently recombine and interfere at the second coupling means; and light also being able to be launched through said second coupling means and into said first and second waveguides to travel in a direction opposite said first direction and coherently recombine at the first coupling means so the light travelling in the opposite direction is able to interfere and then propagate through the said further waveguide.

Preferably the detector is coupled to the further waveguide and to the second coupling means for detecting the counter propagating light signals after interference of those signals so that any disturbance of the first waveguide and/or said second waveguide will change a parameter of the light propagating through the first and/or second waveguides to thereby change the interference patterns detected by the detector to cause the detector to provide an indication of the intrusion.

Preferably the location of the intrusion can be determined by the time difference between receipt of the modified counter-propagating signal travelling in the first direction compared to the receipt of the modified propagating signal travelling in the opposite direction.

Preferably the detector comprises a first detector and a second detector, the first detector and second detector being synchronised and the first detector detecting the counter-propagating signal travelling in the first direction and the second detector detecting the counter-propagating signal travelling in the opposite direction.

Preferably the means for launching light into the waveguides comprises a light source coupled to a third coupling means having first and second output arms, the first output arm being coupled to an input arm of a fourth coupling means and the other output arm being coupled to an arm of a fifth coupling means, an arm of the fourth coupling means being coupled to the further waveguide for launching light into the further waveguide, and an arm of the fifth coupling means being coupled to an arm of the second coupling means for launching light into the second coupling means.

Preferably the first detector is coupled to an output arm of the fourth coupling means and the second detector is connected to an output arm of the fifth coupling means.

The invention also provides a method of monitoring a perimeter, including;

providing a first waveguide below ground level along the perimeter to be monitored;

causing a light signal to propagate through the waveguide; and detecting a change in parameter of the light signal to indicate an intrusion across the perimeter.

Preferably a second waveguide is provided and the light signal is launched into the first and second waveguides;

the method including causing the light signal in the first waveguide and the second waveguide to combine and interfere; and the detecting step comprising detecting the interference pattern so that a change in interference pattern indicates in intrusion across the perimeter.

Preferably the method further includes;

causing counter-propagating light signals to propagate through the first and second waveguides, detecting modified counter-propagating signals caused by a change in parameter of the signals due to an intrusion across the perimeter and determining the location of the intrusion by measuring the time difference between receipt of a modified counter-propagating signal travelling in a first direction compared to receipt of a modified counter-propagating signal travelling in the opposite direction.

BRIEF DESCRIPTION OF THE DRAWINGS

A preferred embodiment of the invention will be described, by way of example, with reference to the accompanying drawings in which.

DESCRIPTION OF THE PREFERRED EMBODIMENT

Figure 1:
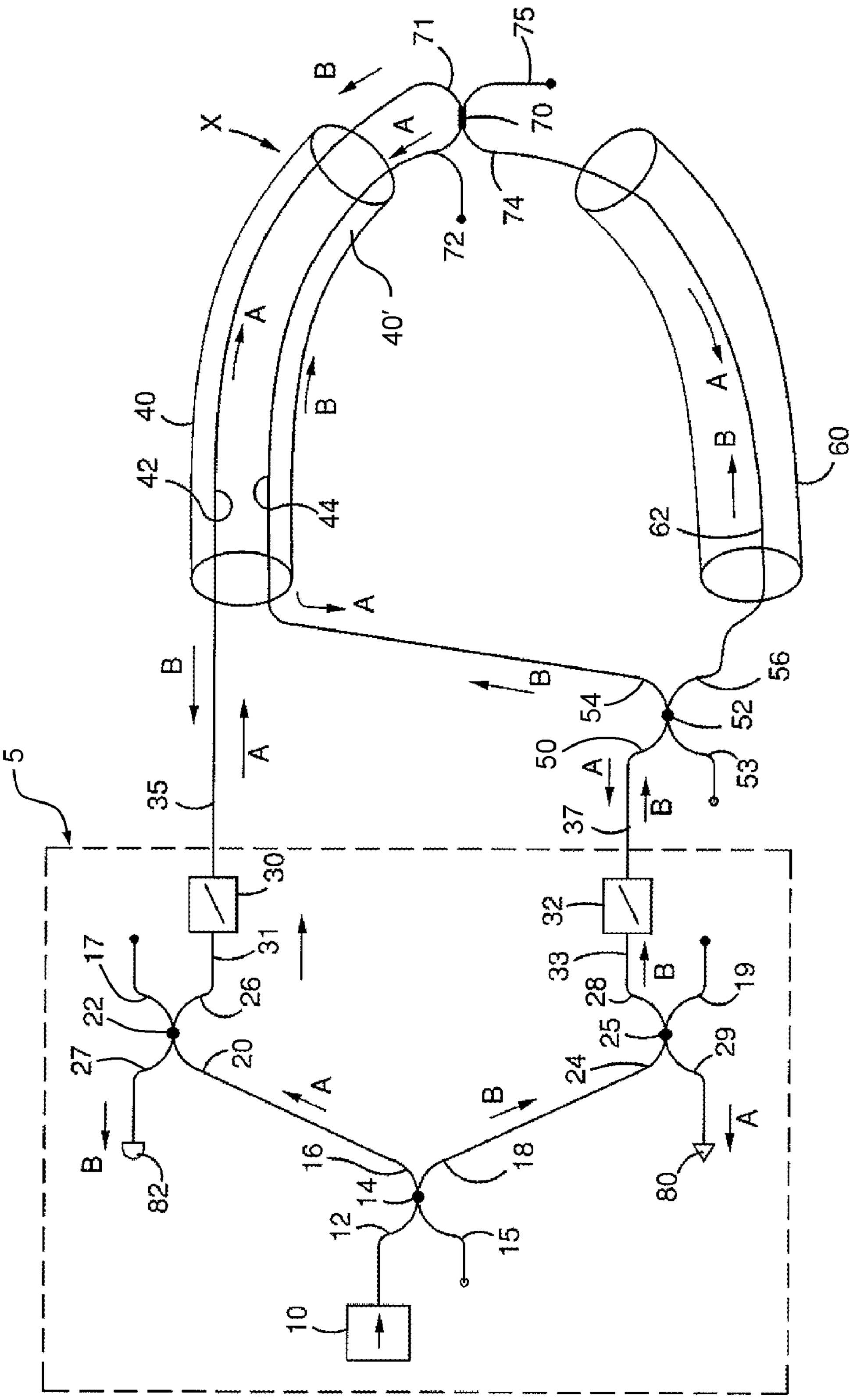
FIG. 1 is the schematic view showing the layout of the system according to one embodiment of the invention.

With reference to FIG. 1 a transmitting and detecting section 5 is shown which includes a light source 10 such as a pigtailed laser diode which launches light into first arm 12 of coupler 14. The coupler 14 has output arms 16 and 18 connected to input arm 20 of a coupler 22 and input arm 24 of a coupler 25. Coupler 14 has an arm 15 which is not used and couplers 22 and 25 have arms 17 and 19 which are also not used. Arms 26 and 28 of the couplers 22 and 25 are connected to connectors 30 and 32 by fibres 31 and 33.

The detecting section of the system shown in FIG. 1 comprises a first cable 40 and a second cable 60. The first cable 40 has two waveguides 42 and 44 in the form of optical fibres and the second cable 60 has a waveguide 62. In practice, optical fibre cables generally include at least two fibres and more commonly at least four or six fibres. For the purposes of the preferred embodiment of the present invention if the cables 40 and 60 include more optical fibres then, in the case of the cable 40, only two of the fibres need be used and in the case of the cable 60 only one of the fibres is used. The connector 30 connects directly to fibre 42 of the cable 40.

The connector 32 is connected to arm 50 of optical coupler 52. The optical coupler 52 has arms 54 and 56 which are connected to the fibre 44 and the fibre 62 respectively. Arm 53 of the coupler 52 is not used.

The fibres 42, 44, and 62 pass all the way through the cables 40 and 60 respectively and the cables 40 and 60 may have a considerable length of many kilometers.

The fibre 42 which exits the cable 40 is connected to arm 71 of coupler 70 and the fibres 44 and 62 which exit the cables 40 and 60 respectively are connected to arms 72 and 74 of the coupler 70. The arm 75 of the coupler 70 is not used.

The couplers 22 and 25 have arms 27 and 29 respectively which are connected to detectors 82 and 80.

In use, light is launched by the pigtailed laser diode 10 into arm 12 of coupler 14 and then branches into arms 16 and 18 of the coupler 14 so as to be received by the couplers 22 and 25. The light from the coupler 22 passes through arm 26, connector 30, fibre lead 35 and into fibre 42. The light from the light source 10 therefore follows arrow A shown in FIG. 1 along the length of the fibre 42 to arm 71 of coupler 70 and then from coupler 70 into arms 72 and 74 and then into fibres 44 and 62. The light travelling in the direction of arrow A therefore follows two different paths through the fibres 44 and 62 and is then recombined by coupler 52 into output arm 50. The light then propagates through fibre lead 37, connector 32, fibre 33, arm 28, coupler 25 and arm 29 to detector 80. When the light recombines at coupler 52 the light travelling through fibres 44 and 62 interferes so as to produce an interference pattern which is detected by the detector 80.

The light which travels from source 10 into arm 18 and then into arm 24 of coupler 25 moves in the direction of arrow B through connector 32, arm 50 of coupler 52 and into arms 54 and 56. The light therefore propagates along the fibres 44 and 62 in the direction of arrows B as shown and into arms 72 and 74 of the coupler 70. The light is recombined in the coupler 70 and passes through arm 71 into fibre 42 so that the light propagates along the fibre 42, through fibre lead 35, connector 30, fibre 31, coupler 22 and into arm 27 to be detected by detector 82. Once again, when the light travelling in the direction of arrow B recombines at the coupler 70 the light travelling through cables 62 and 44 is able to interfere because the light has traveled through two different path lengths along the fibres 44 and 62 so that the light will interfere when it coherently recombines. Thus, the detector 82 is also able to detect the interference pattern caused by the interference of the light which is travelling through the fibres 44 and 62 in the direction of arrow B.

Thus, according to this embodiment of the invention two counter-propagating signals pass through the fibres 44 and 62 of the cables 40 and 60. The first counter-propagating signal is the signal which travels in the direction of arrow A and the second signal is the signal which travels in the direction of arrow B.

If one or the other of the cables 40 or 60 is disturbed a change in the property of the light travelling through the cable at the position of disturbance will be created. For example, the change in property may be a change in phase of the light signal propagating through the respective fibres. The change in parameter of the light, such as the change in phase of the light signal, will alter the interference pattern caused when the light signals recombine either at the coupler 70 or the coupler 52 to thereby change the interference pattern which is received by the detectors 80 and 82. By determining the time difference between the receipt of the altered interference patterns at the detectors 80 and 82 the location of the disturbance of the respective one of the cables 40 or 60 can be calculated so that an indication of where an intrusion has taken place along the length of the cables 40 and 60 can be identified. The counter-propagating technique for enabling the location of a disturbance to the fibres to be determined is disclosed in our aforesaid International application PCT/AU99/01028 and also in our Australian provisional application number PR3169 filed 16 Feb. 2001. The contents of this provisional application as well as the International application are incorporated into this specification.

In order for the detectors 80 and 82 to be able to calculate the time difference between receipt of the modified counter-propagating signals, that is the change in interference pattern, the detectors 80 and 82 should be synchronised. Alternatively, a single detector could be utilised to detect both of the counter-propagating signals so that the signal detector has a synchronised reference to enable the time difference to be determined and which can then be used to determine the length along the cables 40 and 60 at which a disturbance has occurred.

Figure 2:
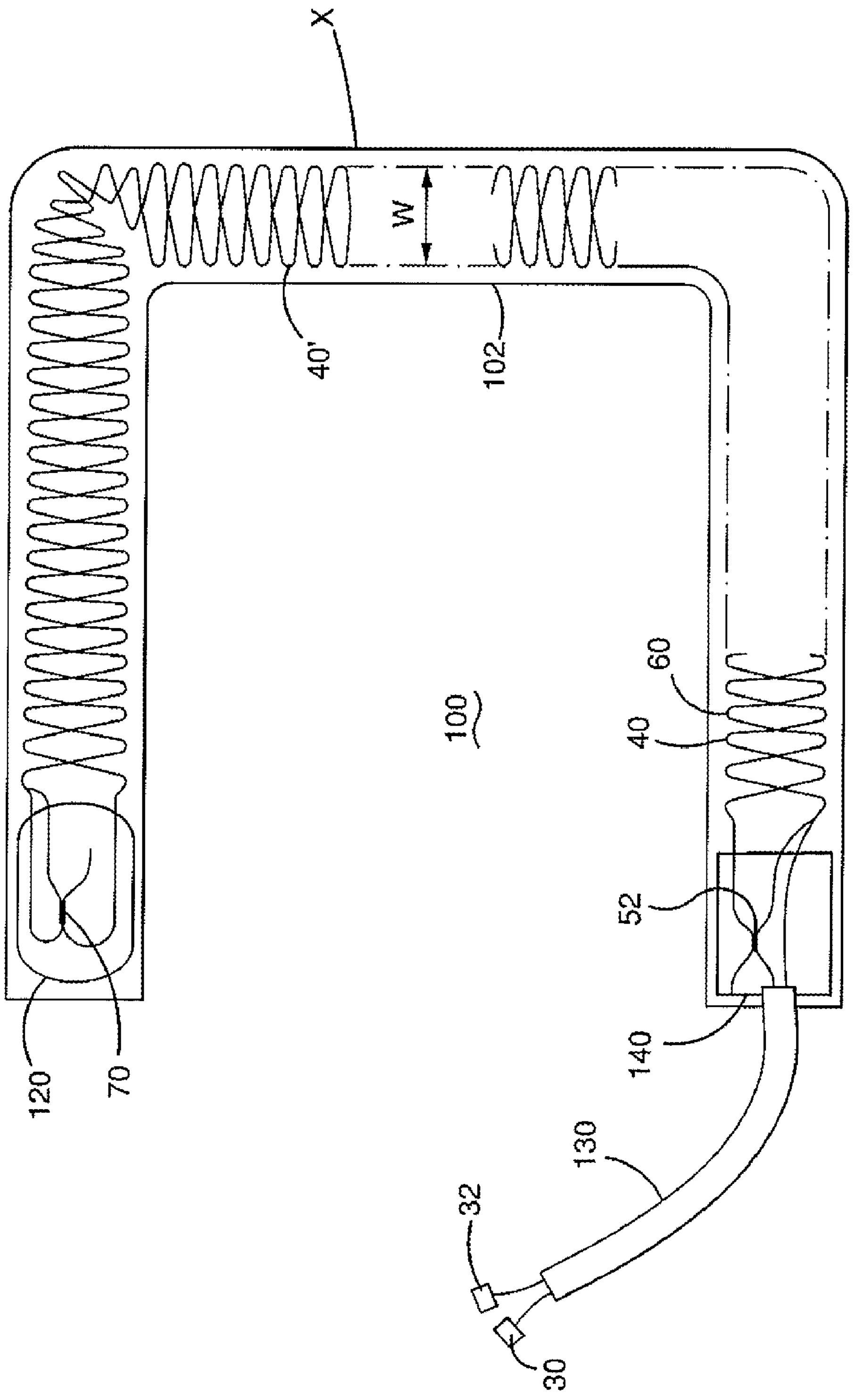
FIG. 2 is a view showing more detail of the actual perimeter formed by the system of FIG. 1.

FIG. 2 shows a layout of the preferred embodiment of the invention in which the perimeter of an area 100 is to be guarded or monitored for intrusion. In order to install the system a trench 102 is dug about the area 100 and the cables 40 and 60 are laid in the trench so as to have a generally zig-zag and overlapping pattern as clearly shown in FIG. 2. This pattern spaces the cables 40 and 60 from one another and also ensures that a substantial width of detection region is provided. In the preferred embodiment of the invention the cables 40 and 60 are buried 50 mm to 80 mm below the surface of the ground. The trench 102 preferably has a width in the direction of double headed arrow W in FIG. 2 of between 1 m and 2 m. When the cables 40 and 60 are buried in the trench 102 the cables are obviously invisible to the naked eye and therefore location of the perimeter and the existence of the detection system can not be identified by any person attempting to intrude into the area 100.

Obviously, rather than be of the general u-shape as shown in FIG. 2 the area 100 can be completely enclosed by the trench 102 and the cables 40 and 60, so as to provide a complete monitoring region about the area 100.

The preferred embodiment of the invention includes an enclosure container 120 into which the ends of the cables 40 and 60 project. The coupler 70 and the exposed fibres which join with the coupler 70 are sealed within the enclosure 120 to prevent ingress of dirt and moisture. The closure 120 can then be buried in the trench 102 with the cables 40 and 60.

Similarly, at the other end of the cables 40 and 60 an enclosure 140 is provided which houses the coupler 52 and the associated exposed fibres so as to prevent ingress of moisture and dirt. Once again, the enclosure 140 is buried in the trench with the cables 40 and 60.

A feeder cable 130 preferably also extends into the enclosure,140 and contains the fibre leads 35 and 37 which join with the connectors 32 and 30. Thus the feeder cable 130 can extend to the location of the transmitting and detecting station 5 so as to couple with the fibres 31 and 33.

When the system is installed the trench 102 therefore provides an effective monitoring perimeter about the area 100. Any person attempting to gain access into the area 100 will walk over the trench 102 and the weight of the person will apply a load to the cables 40 and or 60 or possibly move the cables 40 and/or 60 as the person walks over the width of the trench 102. The load or movement of the cables 40 and 60 will in turn cause a loading or movement of the fibres 62 or 44 which in turn will cause a change in the aforementioned parameter of the counter-propagating signals passing through the fibres. This change in parameter, such as a change in phase of the signal, will change the interference pattern when the phase changed signal recombines with the signal travelling through the other of the fibres so as to cause a change in the interference pattern.

Detection of the changed interference pattern by one of the detectors 80 or 82 provides an indication of an intrusion over the trench 102. The intrusion can be monitored by mere visual inspection of the interference pattern or by an alarm signal such as an audible or visual alarm signal being generated upon change of interference pattern indicative of an intrusion across the cables 40 and 60. The location of the intrusion can be determined by the time difference between receipt of the changed interference pattern at the detector 80 compared with the changed interference pattern at the detector 82. This enables personnel to be dispatched to the appropriate place to intercept the intruder.

For example, if an intruder attempts to make an intrusion at position X, the intruder will walk over the trench 102 which is not detectable to the naked eye and merely is just a continuation in the ground from outside the area 100 to inside the area 100. The intruder will, for example, step immediately above or very close to the cable 40 at location 40' for example. This will apply a loading or a movement to the fibre 44 which will change the property of the counter-propagating light signals travelling through those fibres. Thus, the modified, or phase changed signals A and B will propagate from the position 40' in cable 40 in the direction of arrow A and also in the direction of arrow B. The time taken for the modified signal to travel from the point 40' in the direction of arrow B to coupler 70 where it will cause a changed interference pattern when it interferes with the signal B travelling through the fibre 62, compared with the time taken for the modified signal to travel in the direction of arrow A from the location 40' to interfere at coupler 52 with the signal travelling in the direction of arrow A in fibre 62, will provide an indication of the distance along the trench at which the disturbance has occurred. Therefore appropriate personal can be dispatched to the region of the disturbance to intercept the intruder.

If multiple wavelength sources are utilised, preferably the couplers 14, 22, 25, 52 and 70 are wavelength multiplexing/de-multiplexing waveguide couplers to thereby minimise loss of signal when the signals are combined or separated by the couplers.

If the length of the cables 60 and 40 are particularly long the fibres 35, 37, 42, 44 and 62 may include optical amplifiers along their length. Because the fibres convey signals in both directions in order to provide the counter-propagating signals discussed above, it is necessary that any amplifier station accommodate the travel of the signals in both directions along the fibres. Thus, if the optical amplifiers are not bi-directional, an amplifier assembly of the type disclosed in our aforesaid provisional application filed 16 Feb. 2001 can be utilised.

The preferred embodiment of the invention has the advantage that the buried cables 40 and 60 are sensitive enough to detect even the slightest foot-fall, continuously and discretely, twenty-four hours a day everyday for many years. Their performance is completely unaffected by changes in the local environment (rain, hail, temperature, electrical storms and magnetic loads). Noise and vibration effects from background traffic can be screened out. Washouts do not disable the system and can be repaired.

The system also has the advantage that it is non-detectable in that the fibres cannot be detected by metal detectors because no metal is required in the cables, the fibres can also not be detected by emissions because there is no electromagnetic radiation emanating from the fibres and, assuming that the region of the trench 102 is restored to its original condition before digging, the location of the cables and 40 and 60 are impossible to detect. The sensitivity of the detecting system and therefore the provision of any alarm condition, can be set or changed at will to suit the local environment and the operators needs. Cable sensitivities aren't effected by is lengths up to 60 km and cabling can easily be extended to 350 km or more (using appropriate amplification if desired). Hence, trench lengths of up to 70 km are possible or areas of greater than 125,000 $m^2$.

Extensive systems may be broken into multiple zones, each of the which may have different sensitivity levels set. Sensitivity levels may be preset at different values for different time zones of the day.

For maximum effect the cables should be laid in a shallow trench at least 1.8 m wide, for the entire length of the sensitive zone. This area must be excavated by a suitable machine or by hand to a uniform depth of between 50 and 80 mm. The soil removed in the process is used to backfill the trench once the cables are laid. The trench base need not be flat and no particular care is needed to maintain a particular depth or uniformity.

The cables are terminated at each end of the trench or at only one end. Provision must be made to connect the sensor cables to a feeder cable 130 at one end of the trench. The feeder cables(s) is contained in suitable PVC conduit, from the trench to the position of the computer terminal. This conduit should be buried at least 200 mm below the surface of the ground until it can penetrate a wall or floor of a building or cabinet. The sensor cables should be normal, commercial grade 2 core or 4 core tight buffered optical fibre communication cables, usually 6 mm in diameter. Preferably two cables are required for each system. They are preferably identical.

The sensor cables are laid along the bottom of the trench, in a closely spaced wave or zig-zag pattern that runs across the full width of the trench. It is essential that the wave or zig-zag pattern of one cable is opposite (a mirror image) to that of the other cable, ie they are 180% out of phase, see FIG. 2. The cables may touch as they cross over. There is no need to maintain close control over the relative depths of the two cables.

For maximum sensitivity the spacing between the two opposing wave peaks should be in the 400-500 mm range. A wider spacing may still be effective, but the sensitivity begins to fall off if the spacing exceeds 500 mm.

Once the cables are laid, spliced to the feeder cables(s) and tested, they may be buried. The cables should not be lifted or substantially moved during the back filling operation and hence it is recommended that the first 40-50 mm of fill should be done by hand or more carefully with a small machine. This should then be roughly leveled and consolidated by a light roller or a tamping machine. The remainder of the soil can then be backfilled and consolidated with normal earth moving plant such as a front-end loader. The surface should be smoothed, with an allowance for slumping, and then re-grassed if appropriate.

Although arms 15, 17, 19, 53 and 75 of the various couplers are not used in the embodiment described above, those arms could be used for power/maintenance monitoring.

Furthermore, although the preferred embodiment has been described with reference to the counter-propagating signals which traverse through the fibres 44 and 62, the fibres 44 and 62 could merely include a signal which traverses in only one direction and in this embodiment the fibres 44 and 62 are not joined but rather have ends which are polished to form mirrors so that the light signal is reflected back through the fibres 44 and 62 to the coupler 52 where those signals interfere to produce the interference pattern. This embodiment provides sensitivity and will alert to an intrusion but will not enable the location of the intrusion to be identified.

Since modifications within the spirit and scope of the invention may readily be effected by persons skilled within the art, it is to be understood that this invention is not limited to the particular embodiment described by way of example hereinabove.

The invention claimed is:

1. A perimeter security system including;

at least a first waveguide and at least a second waveguide buried below ground level and extending along a perimeter which defines an area to be monitored;

means for launching light into the first and second waveguides;

a detector for detecting light which has propagated through the waveguides so as to detect a change in a parameter of the light propagating through the waveguides due to an intrusion across the ground beneath which the waveguides are buried and for providing an indication of that intrusion;

the first and second waveguides being provided in separate cables and the separate cables being buried beneath ground level in a zig-zag spaced apart relationship with respect to one another to define a perimeter region having a substantial width which will be traversed by a person intruding into the area;

a first of the said cables contains said at least one waveguide and a second said cable contains said second waveguide;

a further waveguide being contained within the first cable;

first coupling means at one end of the said first, second and further waveguides for coupling the waveguides so that light launched into the said further waveguide is able to propagate through the further waveguide and then into the said first and said second waveguides to propagate in a first direction through the said first and second waveguides;

second coupling means at the other end of said first and said second waveguides so that the light propagating in the said first direction through said first and second waveguides is able to coherently recombine and interfere at the second coupling means; and light also being able to be launched through said second coupling means and into said first and second waveguides to travel in a direction opposite said first direction and coherently recombine at the first coupling means so the light travelling in the opposite direction is able to interfere and then propagate through the said further waveguide.

2. The perimeter security system of claim 1 wherein the detector detects the interference pattern and upon an intrusion a parameter of light passing through one of the waveguides is altered with respect to the same parameter of the light passing through the other of the waveguides, to thereby change the interference pattern detected by the detector to provide an indication of the intrusion.

3. The perimeter security system of claim 1 wherein the substantial width is a width such that a person travelling in normal walking or running motion will not step over the width of the region.

4. The perimeter security system of claim 3 wherein the width of the region is between one and two meters.

5. The perimeter security system of claim 1 wherein counter-propagating light signals are launched into each of the waveguides so that the location of an intrusion can be detected by the time difference between detection of the changed interference pattern propagating in one direction and to the changed interference pattern propagating in the opposite direction.

6. The perimeter security system of claim 1 wherein the detector is coupled to the further waveguide and to the second coupling means for detecting the counter propagating light signals after interference of those signals so that any disturbance of the first waveguide and/or said second waveguide will change a parameter of the light propagating through the first and/or second waveguides to thereby change the interference patterns detected by the detector to cause the detector to provide an indication of the intrusion.

7. The perimeter security system of claim 6 wherein the location of the intrusion can be determined by the time difference between receipt of the modified counter-propagating signal travelling in the first direction compared to the receipt of the modified propagating signal travelling in the opposite direction.

8. The perimeter security system of claim 6 wherein the detector comprises a first detector and a second detector, the first detector and second detector being synchronised and the first detector detecting the counter-propagating signal travelling in the first direction and the second detector detecting the counter-propagating signal travelling in the opposite direction.

9. The perimeter security system of claim 1 wherein the means for launching light into the waveguides comprises a light source coupled to a third coupling means having first and second output arms, the first output arm being coupled to an input arm of a fourth coupling means and the other output arm being coupled to an arm of a fifth coupling means, an arm of the fourth coupling means being coupled to the further waveguide for launching light into the further waveguide, and an arm of the fifth coupling means being coupled to an arm of the second coupling means for launching light into the second coupling means.

10. The perimeter security system of claim 8 wherein the first detector is coupled to an output arm of the fourth coupling means and the second detector is connected to an output arm of the fifth coupling means.

11. A perimeter security system for underground use including:

at least a first waveguide and at least a second waveguide for extending along a perimeter which defines an area to be monitored;

means for launching light into the first and second waveguides;

a detector for detecting light which has propagated through the waveguides so as to detect a change in parameter of the light propagating through the waveguides due to an intrusion across the ground when the waveguides are buried, and for providing an indication of that intrusion;

the first and second waveguides being provided in separate cables, and the separate cables being for location beneath ground level in a zig-zag spaced apart relationship with respect to one another to define a perimeter region having a substantial width which will be traversed by a person intruding into the area;

a first of said cables containing said at least one waveguide and a second said cable containing said second waveguide;

a further waveguide being contained within the first cable;

first coupling means at one end of said first, second and further waveguides for coupling the waveguides so that light launched into said further waveguide is able to propagate through the further waveguide, and then into the said first and said second waveguides to propagate in a first direction through the first and second waveguides;

second coupling means at the other end of said first and said second waveguides so that the light propagating in said first direction through said first and second waveguides is able to coherently recombine and interfere at the second coupling means; and light also being able to be launched through said second coupling means and into said first and second waveguides to travel in a direction opposite said first direction, and coherently recombine at the first coupling means so that the light travelling in the opposite direction is able to interfere and then propagate through said further waveguide.

* * * * *